United States Patent [19]

Ikegami et al.

[11] Patent Number: 5,511,874
[45] Date of Patent: Apr. 30, 1996

[54] DRIVE TRANSMISSION MECHANISM FOR BIAXIAL EXTRUDER

[75] Inventors: Yoshio Ikegami; Masashi Konno; Koji Minagawa; Norifumi Fukano; Tatsuya Uemura; Tatsuo Yagi, all of Takasago, Japan

[73] Assignee: Kabushiki Kaisha Kobe Seiko Sho, Kobe, Japan

[21] Appl. No.: 211,051

[22] PCT Filed: Jul. 26, 1993

[86] PCT No.: PCT/JP93/01039

§ 371 Date: Mar. 23, 1994

§ 102(e) Date: Mar. 23, 1994

[87] PCT Pub. No.: WO94/02302

PCT Pub. Date: Feb. 3, 1994

[30] Foreign Application Priority Data

Jul. 27, 1992 [JP] Japan .................................. 4-220648
Jul. 27, 1992 [JP] Japan .................................. 4-220649

[51] Int. Cl.$^6$ ............................................. B29B 7/58
[52] U.S. Cl. ........................ 366/100; 74/395; 74/409; 74/665 GA
[58] Field of Search ................... 366/69, 83–85, 366/100, 297–301; 425/204, 208, 209; 74/395, 401, 409, 665 G, 665 GD, 665 GA

[56] References Cited

U.S. PATENT DOCUMENTS

| 3,124,061 | 3/1964 | Studli, Sr. .................... 74/401 X |
| 3,630,145 | 12/1971 | Leuenberger .................. 74/395 X |
| 3,894,725 | 7/1975 | Schafer ....................... 366/100 X |
| 4,261,225 | 4/1981 | Zahradnik ..................... 74/665 GA |
| 4,297,917 | 11/1981 | Bauer et al. .................. 74/665 GD |
| 4,514,164 | 4/1985 | Poulin ......................... 366/83 X |
| 4,586,219 | 5/1986 | Blach et al. . |
| 4,796,487 | 1/1989 | De Bernardi ................... 74/665 GA |

FOREIGN PATENT DOCUMENTS

| 2025162 | 12/1971 | Germany . |
| 2261511 | 7/1973 | Germany .............................. 425/204 |
| 3325782 | 11/1984 | Germany . |
| 3802847 | 3/1989 | Germany . |
| 50-111579 | 9/1975 | Japan . |
| 59-214632 | 12/1984 | Japan . |
| 621135 | 1/1987 | Japan . |
| 1169645 | 11/1989 | Japan . |
| 2032047 | 4/1980 | United Kingdom . |

*Primary Examiner*—Charles E. Cooley
*Attorney, Agent, or Firm*—Oblon, Spivak, McClelland, Maier & Neustadt

[57] ABSTRACT

A drive transmission mechanism for a biaxial extruder includes first and second output gears respectively fitted with an axial displacement on first and second output shafts which are connected to first and second screws of a biaxial extruder. A first lower gear and a first upper gear are arranged below and above the first output gear. A second lower gear and a second upper gear arranged below and above the second output gear. A reduction gear train is provided for quartering the drive force of a common drive source equally and distributing the quartered drive force to the first lower gear, the first upper gear, the second lower gear and the second upper gear. The reduction gear train includes an upper intermediate shaft having such gears fitted thereon as mesh with the first upper gear and the second upper gear, individually; a lower intermediate gear having such gears fitted thereon as mesh with the first lower gear and the second lower gear, individually; and a center shaft having a drive gear meshing commonly with upper and lower input gears which are fitted on the upper and lower intermediate gears, respectively.

3 Claims, 6 Drawing Sheets

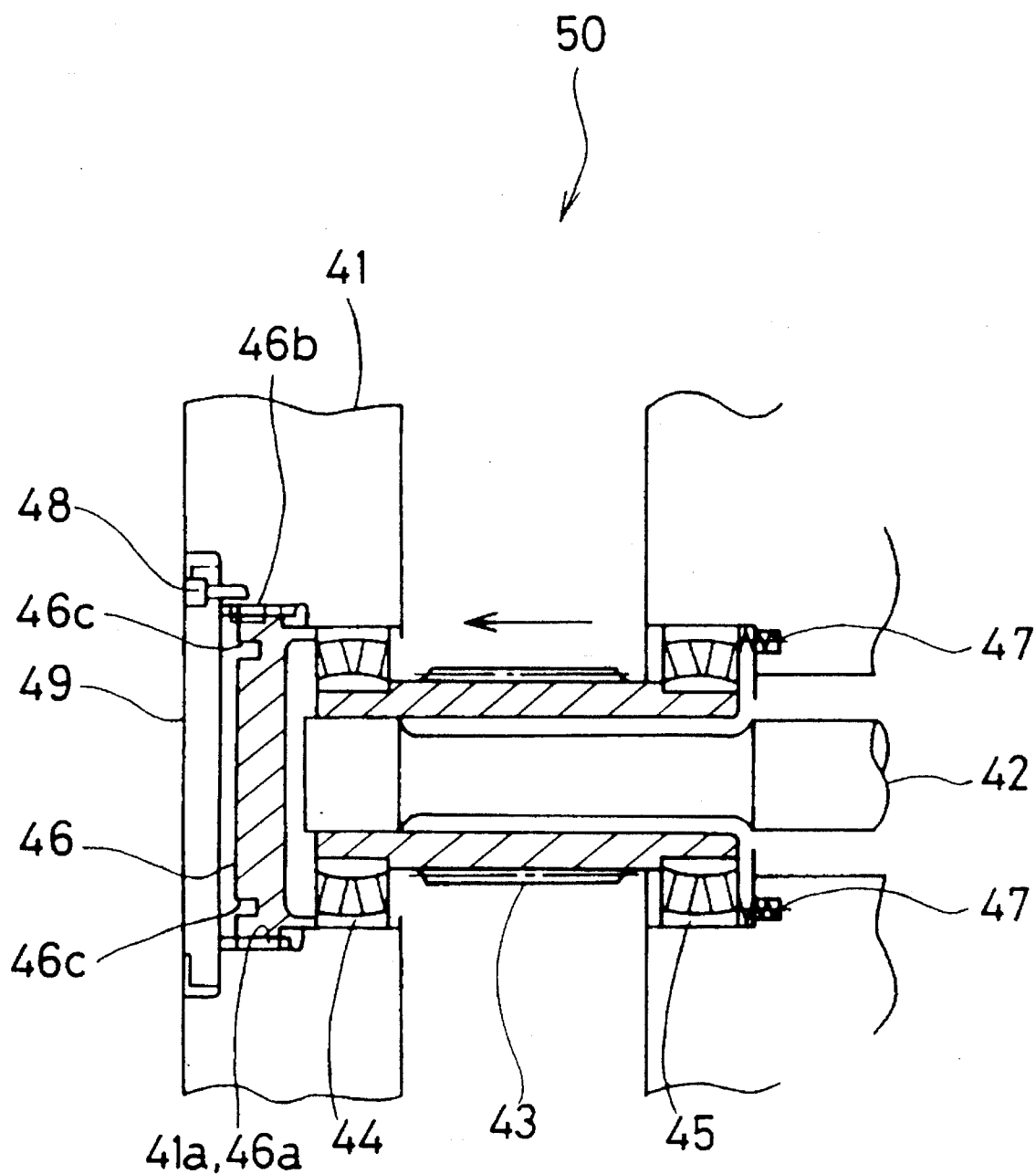
F I G. 4

DRIVE TRANSMISSION MECHANISM FOR BIAXIAL EXTRUDER

TECHNICAL FIELD

The present invention relates to a drive transmission mechanism for use in a biaxial extruder for extrusion-molding plastics.

BACKGROUND OF THE INVENTION

A higher torque is required of the drive transmission mechanism for transmitting a drive force to first and second output shafts rotating integrally with the first and second screws of a biaxial extruder. In order to realize the higher torque, counter-measures have been exemplified by raising the power of the motor, by increasing the bearing size for the increase in the radial force which is generated at the meshing portions of gears such as first and second output gears fitted individually on the first and second output shafts, or by enlarging the width of teeth to ensure the tooth bearing. Because of the extremely restricted axial distance between the two shafts, however, troubles occur in case the bearing size is to be increased or in case the tooth width of gears is to be enlarged, thus making it difficult to transmit the drive force of high torque.

This transmission of the drive force of high torque is known to have been achieved by a drive transmission mechanism disclosed in Japanese Patent Laid- Open No. 1185/1987. This drive transmission mechanism 33 for a biaxial extruder of the prior art will be described with reference to FIGS. 5 and 6. Of these, FIG. 5 is a diagram showing a drive line, and FIG. 6 is a side elevation showing the gear arrangement of FIG. 5. Incidentally, rectangles and thick lines appearing in FIG. 5 indicate gears and shafts, respectively.

This drive transmission mechanism 33 is constructed to include: first and second output gears 3 and 4 fitted with an axial displacement respectively on first and second output shafts which are connected to the first and second screws of the biaxial extruder (the reference numerals 1 and 2 generally refer to both the output shafts and the screws) first lower and upper gears 5 and 6 arranged respectively below and above the axis of the first output gear 3, as shown in FIG. 6; second lower and upper gears 7 and 8 arranged respectively below and above the axis of the second output gear 4, as shown in FIG. 6; and a reduction gear train D for quartering the output of a common drive source C equally and distributing the quarters to those first lower and upper gears 5 and 6 and second lower and upper gears 7 and 8.

The reduction gear train D is composed of: gears 24 and 25 meshing with the first upper and lower gears 6 and 5, respectively; gears 22 and 23 rotating integrally with the gears 24 and 25, respectively; gears 29 and 30 meshing with the second upper and lower gears 8 and 7, respectively; gears 27 and 28 rotating integrally with the gears 29 and 30, respectively; a center shaft 32 equipped at its one end with a gear 21 meshing commonly with the gears 22 and 23 and at its other end with a gear 26 meshing commonly with the gears 27 and 28; and a drive gear 31 fitted on a middle portion of the center shaft 32 for transmitting the drive force of the common drive source C. This reduction gear train D provides a gear train having a symmetric structure with respect to the first and second screws. Incidentally, the center shaft 32 is constructed of toothed joint shafts 32a and 32b for correcting both the phase shift due to the torsional rigidity caused by the difference between the lengths of the output shafts 1 and 2 and the phase shift at the time of assembly.

In the drive transmission mechanism 33 for the biaxial extruder thus constructed according to the prior art, the drive force from the common drive source C is transmitted to the center shaft 32 through the drive gear 31. This drive force is halved and distributed by the center shaft 32 to the first screw line and the second screw line. At this time, the toothed joint shafts 32a and 32b composing the center shaft 32 have their diameters and lengths determined to correct the phase shifts due to the torsional rigidity of the output shafts 1 and 2. Moreover, the drive forces thus distributed are quartered from the gears 21 and 26 at the two ends of the center shaft 32 to the gears 22 and 23 and the gears 27 and 28 and are distributed to the first vertical and second vertical screw lines. The drive forces thus distributed to the first and second vertical screw lines are transmitted vertically equally to the first upper and lower gears 6 and 5 and the second upper and lower gears 8 and 7 by the gears 24 and 25 and the gears 29 and 30, which rotate integrally with the gears 22 and 23 and the gears 27 and 28, respectively. As shown in FIG. 6, moreover, the drive forces are transmitted to the first and second output shafts 1 and 2 to rotate the first and second screws such that the radial loads upon the first and second output shafts 3 and 4 are offset by interposing the first output gear 3 vertically between the first upper and lower gears 6 and 5 and by interposing the second output gear 4 vertically between the second upper and lower gears 8 and 7.

Thus, in the drive transmission mechanism 33 for the biaxial extruder of the prior art, the phase shift due to the torsional rigidity cased by the difference between the lengths of the output shafts 1 and 2 is corrected to synchronize the first and second screws by suitably setting the diameters and lengths of the toothed joint shafts 32a and 32b composing the center shaft 32. Moreover, the radial loads upon the first and second output gears 3 and 4 can be offset to transmit the drive force of high torque to the first and second screws by interposing the first output gear 3 vertically between the first upper and lower gears 6 and 6 and by interposing the second output gear 4 vertically between the second upper and lower gears 8 and 7 to transmit the drive power.

In order to synchronize the first and second screws of the biaxial extruder, the drive transmission mechanism 33 having the aforementioned structure of the prior art has its toothed joint shafts 32a and 32b determined so suitably in their diameters and lengths as to correct the phase shifts due to the torsional rigidity of the first and second output shafts. After these determinations, therefore, in the reduction gear train D having a structure symmetric with respect to the first and second screw lines, the distribution of the drive force at the gear meshing portions has to be equalized so that the drive force may be equally transmitted to the two lines.

In the drive transmission mechanism 33 for the biaxial extruder according to the prior art, however, the first half distribution of the drive force from the common drive source C to the first and second screw lines is accomplished by the center shaft 32 of the reduction gear train D. Hence, the vertical quarter distribution to the upper and lower gears of the first screw line and the vertical quarter distribution to the upper and lower gears of the second screw lines have to be accomplished separately of each other so that as many as eleven gears are required in the shown example. Thus, the drive transmission mechanism 33 of the prior art has problems that the structure is enlarged, that the number of portions requiring the phase adjustments of gears is increased to trouble the assembling work, and that the accumulation of the phase shifts, even if slight, between the gears will fail to equalize the distribution of the drive power.

For the phase adjustments at the assembling time, moreover, only one tooth number of the gears at the two ends of each of the toothed joint shafts 32a and 32b is made different from the other so that the fitting positions of the joint shafts 32a and 32b may be determined to absorb the phase difference. This phase difference absorption at the assembling time is carried out, as disclosed in Japanese Patent Publication No. 12415/1987, by using a spline shaft having its two ends splined with only one tooth number being made different. However, this phase difference absorption is accompanied by measuring the phase shift of one gear train with reference to that of the other and re-assembling the toothed joint shaft and the spline shaft in the positions capable of absorbing the phase difference. Thus, this proposal has a problem that the adjustment takes a long time.

It is, therefore, an object of the present invention to provide a drive transmission mechanism for a biaxial extruder, which can be easily constructed and assembled with the minimum number of gear trains and which can distribute the drive force equally at the meshing portions of gears.

Another object of the present invention is to provide a drive transmission mechanism for a biaxial extruder, which can be timely adjusted to transmit the drive force equally to individual lines without any trouble of disassembling the drive transmission mechanism so as to adjust the phase difference at the assembling time or re-assembling the same.

DISCLOSURE OF INVENTION

In order to achieve the above-specified objects, according to an aspect of the present invention, there is provided a drive transmission mechanism for a biaxial extruder, comprising: first and second output gears respectively fitted with an axial displacement on the first and second output shafts which are connected to the first and second screws of a biaxial extruder; a first lower gear and a first upper gear arranged respectively below and above the axis of said first output gear; a second lower gear and a second upper gear arranged respectively below and above the axis of said second output gear; and a reduction gear train for quartering the drive force of a common drive source equally and distributing the quartered drive force to said first lower gear, said first upper gear, said second lower gear and said second upper gear, wherein said reduction gear train includes: an upper intermediate shaft of torsion bars having such gears fitted thereon as mesh with said first upper gear and said second upper gear, individually; a lower intermediate gear of torsion bars having such gears fitted thereon as mesh with said first lower gear and said second lower gear, individually; and a center shaft having a drive gear meshing commonly with upper and lower input gears which are fitted on said upper and lower intermediate gears, respectively. Thanks to this construction, the drive force from the common drive source is halved by the center shaft and distributed to the upper and lower lines common to the first and second screws and is then quartered by the upper and lower intermediate shafts to the first and second upper lines and the first and second lower lines, so that the accumulation of the unequal distributions of the drive force at the gear meshing portions can be reduced with a smaller number of gears. Moreover, not only the phase shifts due to the difference between the torsional rigidity due to the difference between the lengths of the first and second output shafts but also the phase shifts of the gears due to the wears or the like of the gears can be corrected through the twists of the torsion bars themselves, to eliminate the back-lashes at the gear meshing portions thereby to ensure the equal distribution of the gear trains.

According to another aspect of the present invention, there is provided a drive transmission mechanism for an biaxial extruder, comprising: first and second output shafts connected to the screws of a biaxial extruder for halving the drive force and transmitting them; a gear fitted on at least one of said first and second output shafts; upper and lower distribution gear trains interposing said gear in between and having helical gears for quartering said drive force; and axial fine move means for fitting at least one helical gear of one of said upper and lower distribution gear trains slidably on a shaft. According to still another aspect of the present invention, there is provided a drive transmission mechanism for an biaxial extruder, comprising: first and second output shafts connected to the screws of a biaxial extruder; first and second gear trains having helical gears for distributing and transmitting the drive from a common gear to said first and second output shafts; and axial fine move means for fitting at least one of the helical gears of one of said first and second gear trains slidably on a shaft. If the upper and lower distribution gear trains or the first and second gear trains are thus constructed, the phase at the gear meshing portions can be changed to adjust the phases of the gears at the assembling time as the helical gear gears move in the thrust direction.

BRIEF DESCRIPTION OF THE DRAWINGS

FIG. 4 is a section showing a gear in the drive transmission mechanism of the biaxial extruder of the present invention;

BEST MODE FOR CARRYING OUT THE INVENTION

Figure 5:
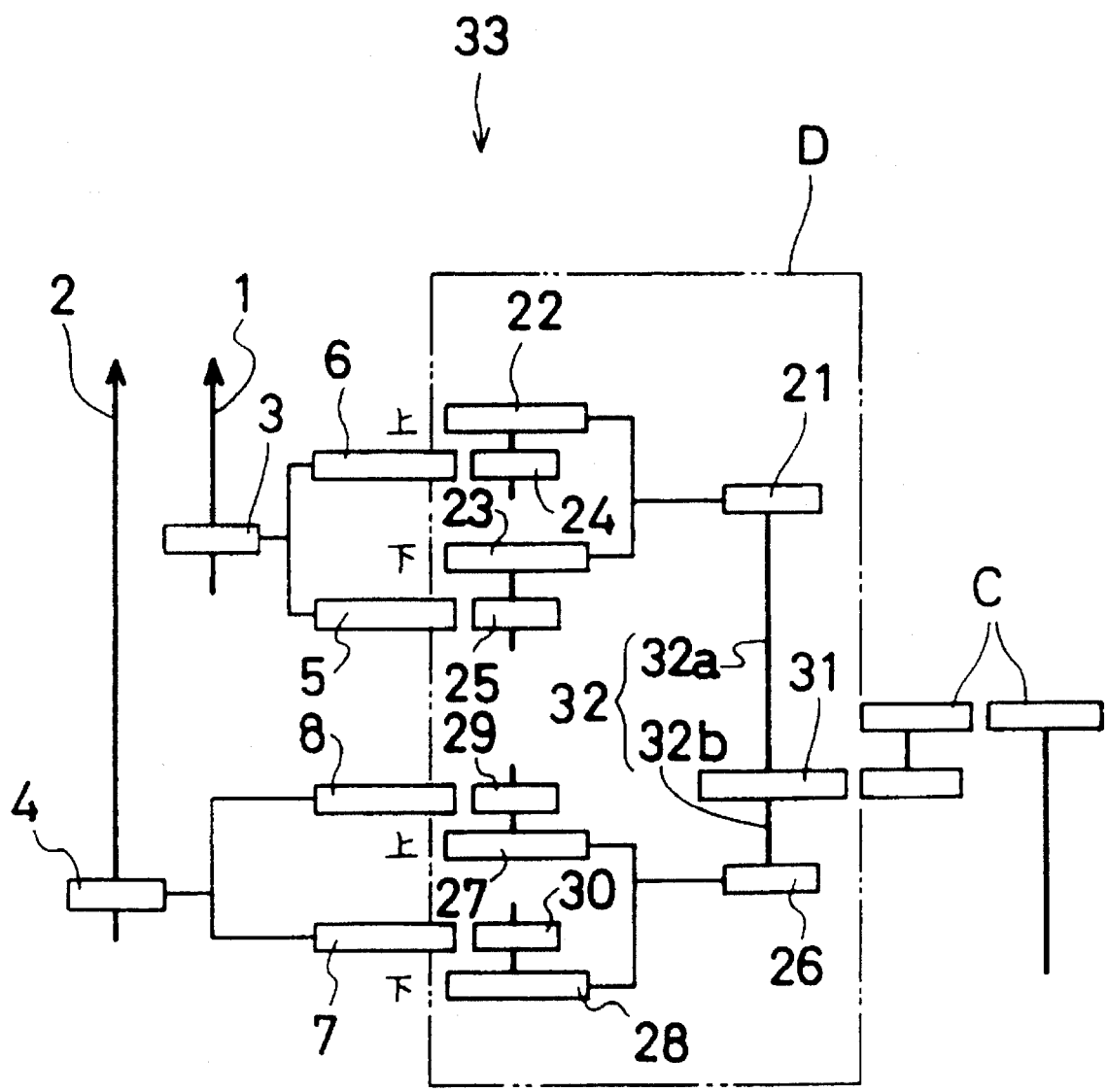
FIG. 5 is a diagram showing a drive line of the drive transmission mechanism of the biaxial extruder of the prior art.
Figure 6:
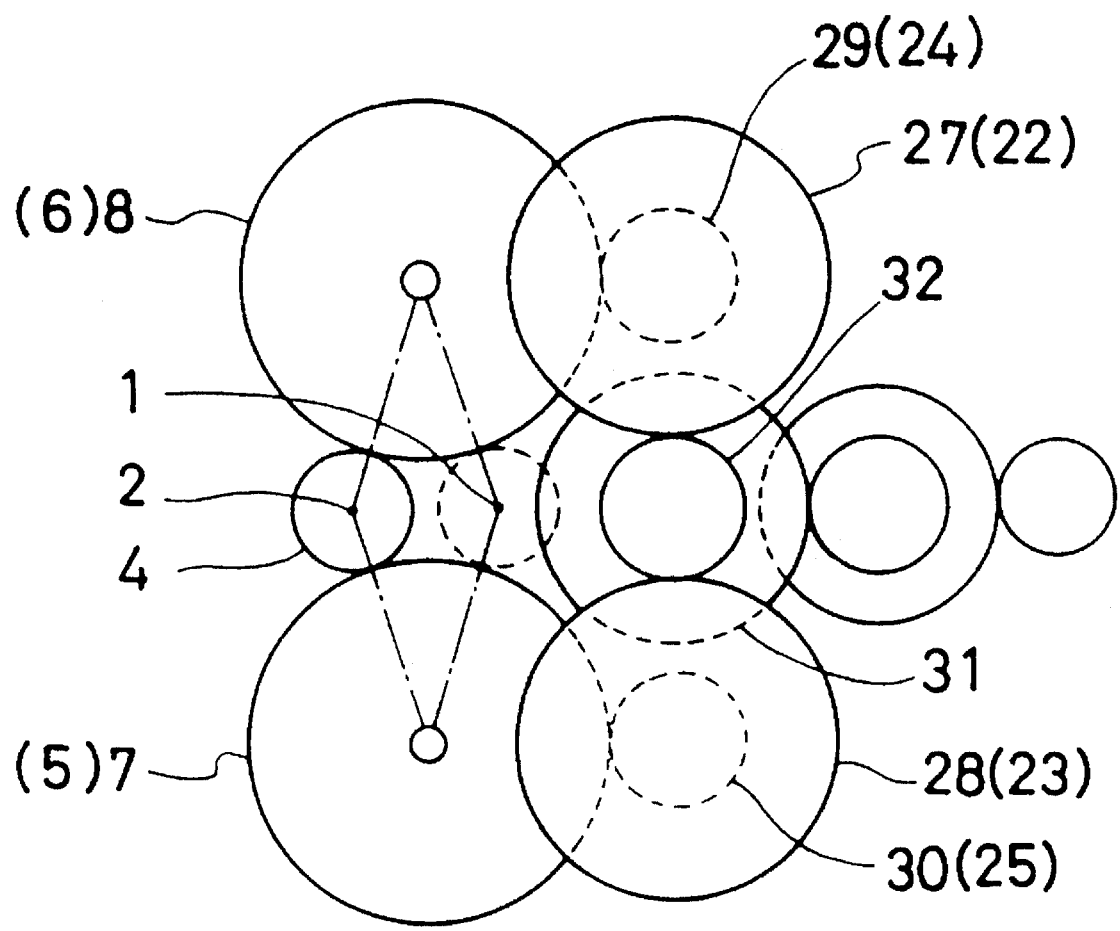
FIG. 6 is a side elevation showing the gear arrangement of FIG. 5.

A drive transmission mechanism 19 for a biaxial extruder according to the present invention will be described in connection with its embodiments with reference to the accompanying drawings. In the drive line diagram of FIG. 1, the portions have the same actions as those of FIG. 5 are designated at the common reference numerals, and their description will be omitted. What is different from construction of FIG. 5 resides in a reduction gear train B and torsion bars 11a and 11b, and 14a and 14b, as indicated by dash lines.

Figure 1:
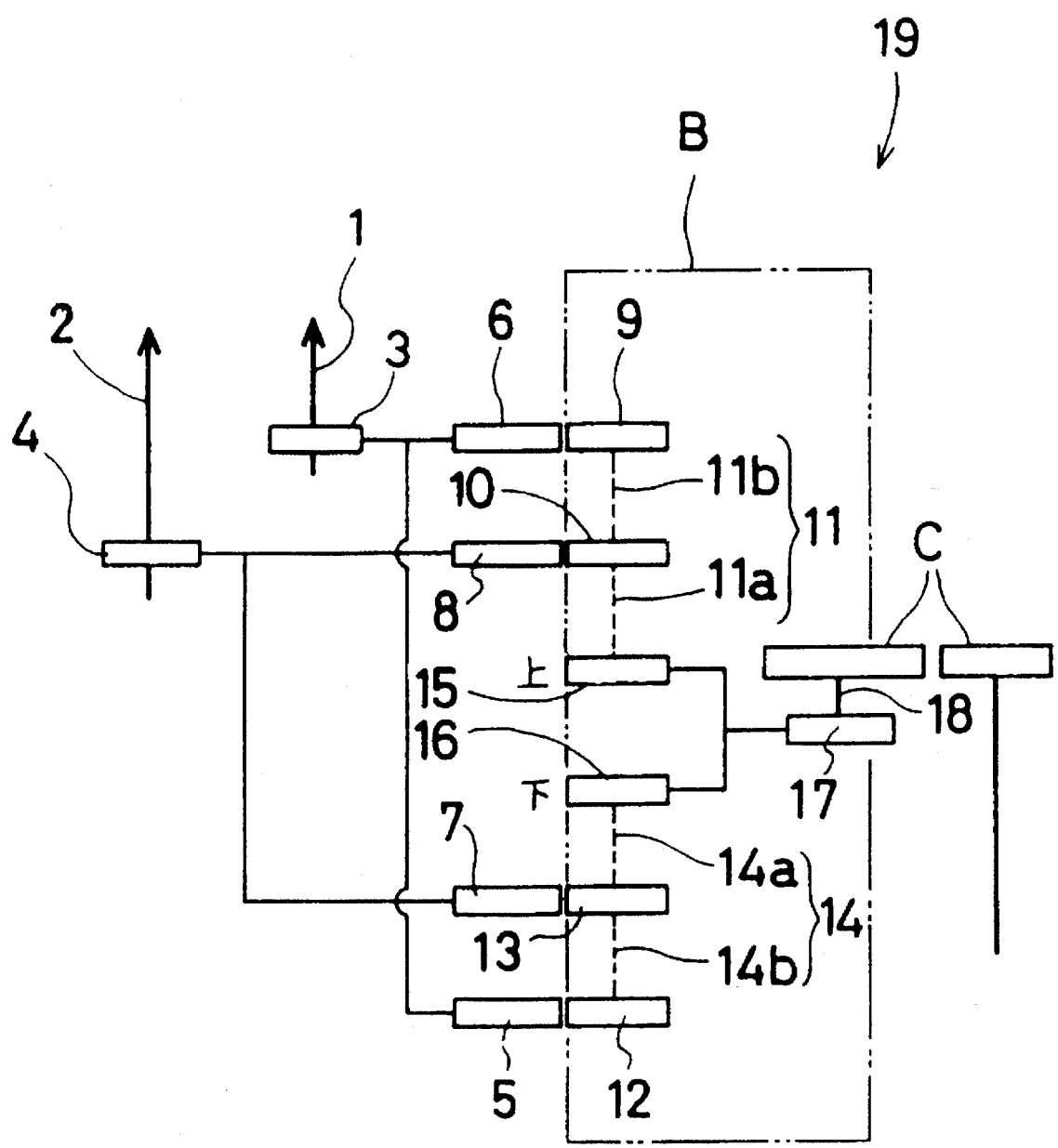
FIG. 1 is a diagram showing a drive line of a drive transmission mechanism of a biaxial extruder according to the present invention.
Figure 2:
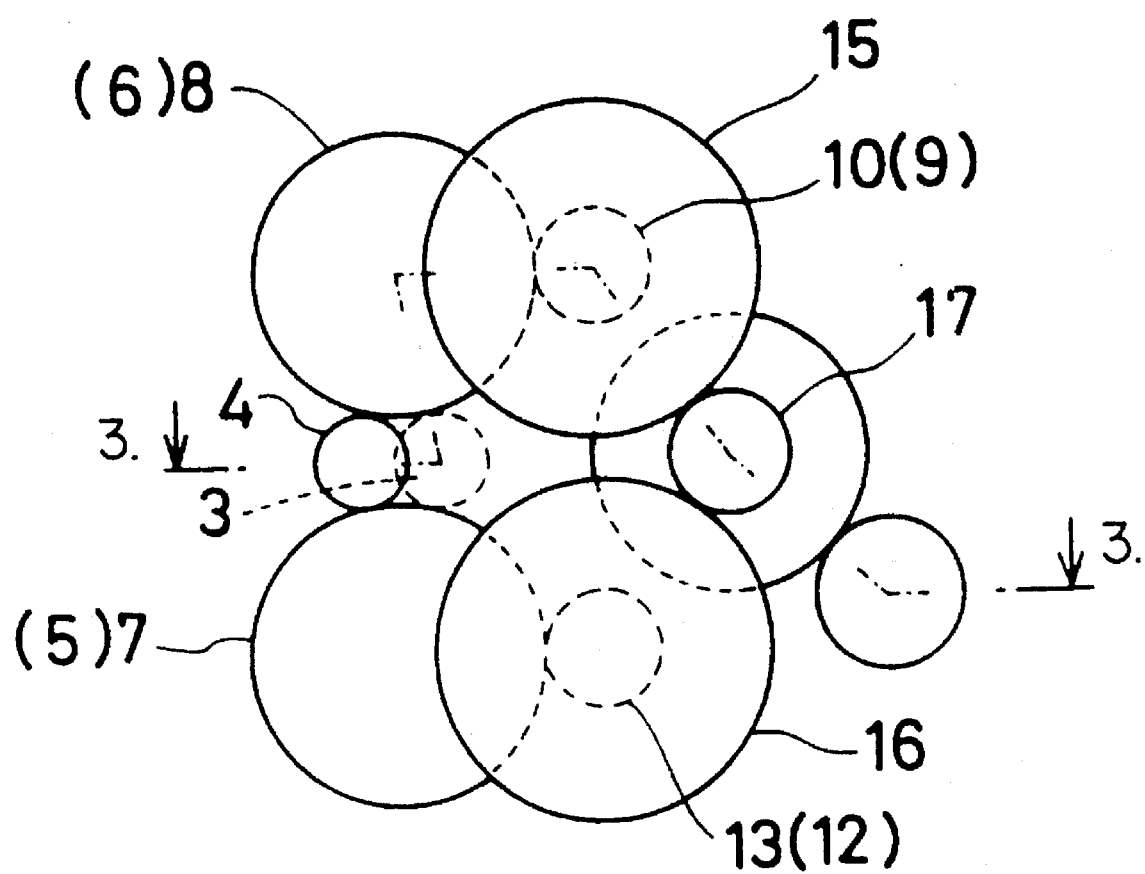
FIG. 2 is a side elevation showing the gear arrangement of FIG. 1.
Figure 3:
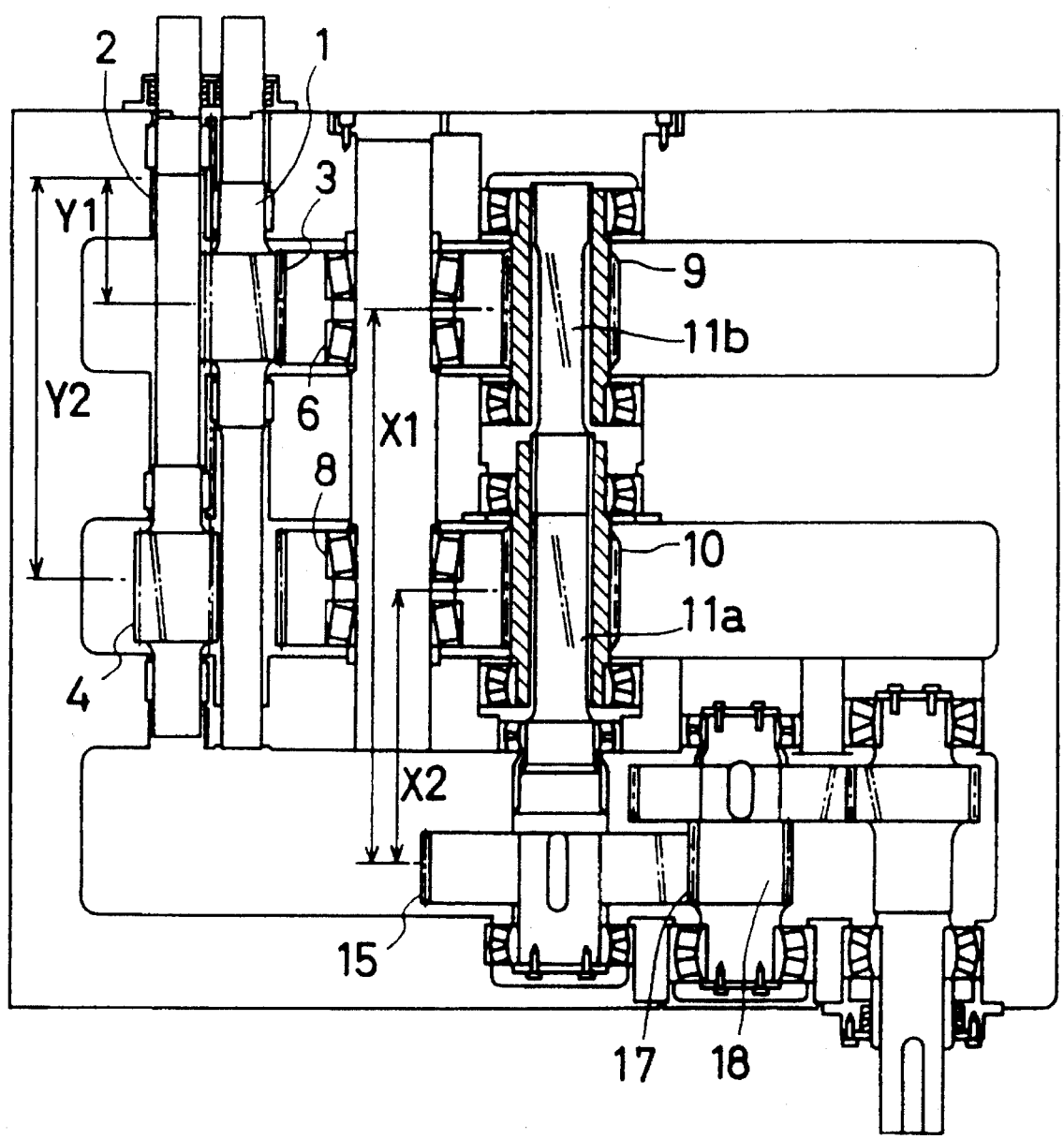
FIG. 3 is an expansion plan, as taken along 3—3 of FIG. 2.

In FIGS. 1 and 2, the reduction gear train B is constructed to include: an upper intermediate shaft 11, on which are fitted gears 9 and 10 meshing with the first and second upper gears 6 and 8, respectively; a lower intermediate shaft 14, on which are fitted gears 12 and 13 meshing with the first and second lower gears 5 and 7, respectively; and a center shaft 18 having a drive gear 17 meshing commonly with upper and lower input gears 15 and 16 which are fitted on those upper and lower intermediate shafts 11 and 14, respectively. In order to correct the phase shift due to the torsional rigidity of the output shafts 1 and 2, the gears 10 and 13 are arranged, as shown in FIG. 3 (only gear 10 is shown in FIG. 3), so that the difference of the torsional rigidity to be caused by the difference between the length X1 and X2 may be equal to the difference of the torsional rigidity to be caused by the difference between the length Y1 and Y2. The above X1 shows the distance from the upper input gears 15 to the gears 9 or the distance from the lower input gears 16 to the gears 12. The above X2 shows the distance from the upper input gears 15 to the gears 10 or the distance from the lower input gears 16 to the gears 13. And, the above Y1 shows the distance from the first output gears 3 and the joints of the first screws at the first output shafts 1. The above Y2 shows the distance from the second output gears 4 and the joints of the second screws at the second output shafts 2.

Moreover, the upper and lower intermediate shafts 11 and 14 are formed of four torsion bars 11*a* and 11*b*, and 14*a* and 14*b*, and the torsion bars 11*a* and 14*a* are respectively splined to the torsion bars 14*b* and 11*b*.

Since the reduction gear train B has the structure described above, the drive force of the common drive source C is distributed one half by the center shaft 18 to the upper and lower lines common to the first and second screws, and then one quarter by the upper and lower intermediate shafts 11 and 14 to the first and second upper lines and the first and second lower lines. This construction reduces the number of gears to a smaller value of 7 than that of the prior art, so that an accumulation of unbalances of the drive force distribution at the meshing portions of the gears decreases. As a result, the structure and assembly can be simplified by the minimized gear train, and the distribution of the drive force at the meshing portions of the gears can be equalized. Moreover, the phase shifts due to the torsional rigidity of the output shafts 1 and 2 can be corrected according to the positions of the gears 10 and 13.

Since, moreover, the upper and lower intermediate shafts 11 and 14 are formed of the torsion bars 11*a*, 11*b*, 14*a* and 14*b*, the phase shifts due to the difference between the torsional rigidity caused by the difference between the lengths of the first and second output shafts and the phase shifts of the gears due to the wears or the like of the gears are corrected by the torsional bars twisting themselves to eliminate the back-lash at the meshing portions of the gears. As a result, the distribution of the drive force at the meshing portions of the gears is equalized.

For example, if a phase shift occurs at the input gear 15 when the drive force of the input gears 15 or 16 is distributed by the drive gear 17, as shown in FIG. 1, the torsion bar 11*a* itself accordingly twists to eliminate the back-lash at the gear meshing portions thereby to retain a sufficient gear meshing engagement. If a phase shift occurs at the input gear 16, the torsion bar 14*a* itself twists to eliminate the back-lash at the gear meshing portions thereby to retain a sufficient gear meshing engagement. Moreover, the torsion bar 11*b* itself twists, if a phase shift occurs between the gears 9 and 10, and torsion bar 14*b* itself twists if a phase shift occurs between the gears 13 and 12, so that the individual back-lashes at the gear meshing portions are eliminated to retain sufficient gear meshing engagements.

Incidentally, if it is intended to attain the effects of the torsion bars at the drive transmission mechanism 33 of the biaxial extruder of the prior art, this structure requires a number of torsion bars not only at the toothed joint shafts 32*a* and 32*b* composing the center shaft 32 but also at the six portions between the gears 22 and 24, between the gears 23 and 25, between the gears 27 and 29 and between the gears 28 and 30.

With reference to FIG. 4, here will be described another example using means 50 for finely moving helical gears in the axial direction in the gears 9, 10, 13 and 12 of the drive transmission mechanism 10 shown in FIG. 1. This axial fine move means 50 is incorporated to absorb the phase difference at the assembling time without assembling the shafts 11 and 14 again.

The axial fine move means 50 is constructed to include: a helical gear 43 made slidable in a thrust direction; bearings 44 and 45 for supporting a shaft 42 together with the helical gear 43 rotatably in a radial direction; an adjust screw 46 for positioning the helical gear 43 indirectly through the bearing 44 at the thrust load side of the helical gear 43; and a spring 47 for urging the helical gear 43 indirectly through the bearing 45 from the anti-load side.

The axial fine move means 50 thus constructed is accommodated in a casing 41. Incidentally, the adjust screw 46 has its outer circumference externally threaded at 46*a* to engage with an internally threaded portion 41*a* of the casing 1, and the shaft 42 has its central portion constricted to prevent its direct contact. To the casing 41, moreover, there is removably mounted by a screw 48 a cap 49 which allows the adjust screw 46, when removed, to adjust the phase from the outside. Designated at reference numeral 46*b* is a stopper for stopping the helical gear 43 after the positioning of the adjust screw 46. Moreover, the adjust screw 46 or the like is made hollow for the intermediate gear.

The axial fine move means 50 thus constructed is premised by the use of the helical gear, and its operations will be described in the following. When a gear is to have its phase adjusted after the drive transmission mechanism has been assembled, the screw 48 of the casing 41 is loosened to remove the cap 49, and the adjust screw 46 is turned by an auxiliary member having a face to engage with the recesses 46*c* formed in the adjust screw 46, so that it is moved in the thrust direction. In accordance with this, the helical gear 43 is also moved in the thrust direction so that its own phase changes at its meshing portion. Thus, the gear has its phase adjusted and is positioned. After this, the adjust screw 46 is fixed by the stopper 46*b*, and the cap 49 is applied and fixed by the screw 48, thus finishing the phase adjustment.

If this axial fine move means 50 for the helical gear is attached to each of the gears 9, 10, 13 and 12 of the drive transmission mechanism 19 of the biaxial extruder according to the present embodiment, as shown in FIG. 1, the phase adjustment at the assembling time can be effected without any trouble such as a re-assembly so that the adjustments can be timed to distribute the drive force equally to the individual lines. Thus, it is possible to provide a drive transmission mechanism for a biaxial extruder, which can have its two screws sufficiently synchronized and transmit a drive force of high torque. In addition, the urging force of the spring 47 is active even when the drive transmission mechanism of the biaxial extruder is inactive, so that the chattering at the helical gear 43 and the bearings 44 and 45 can be regulated.

The present invention should not be limited to the drive transmission mechanism 19 for the biaxial extruder, as shown in FIG. 1, in which the drive force is distributed one quarter to the upper and lower distribution gear trains which vertically interpose the gears 3 and 4 fitted on the first and second output shafts 1 and 2. The present invention can also be applied to another drive transmission mechanism for a biaxial extruder, which is modified such that the drive force is from a common gear is distributed and transmitted through a first gear train and a second gear train to a first output shaft and a second output shaft connected to the screws of the biaxial extruder, that is, through the upper and lower distribution gear trains but not through the gears fitted on the first and second output shafts. In this modification, the gear trains are constructed of helical gear trains, and at least one helical gear of the first or second gear train is slidably fitted on the corresponding shaft. According to this modification, even if the axial fine move means for the helical gear is added, the drive transmission mechanism need not be disassembled for the phase adjustment. This phase adjustment can be accomplished with a trouble such as the re-assembly so that the adjustments can be timed to transmit the drive force equally to the individual lines.

INDUSTRIAL APPLICABILITY

As has been described hereinbefore, the present invention can be most properly applied to a drive transmission mechanism for a biaxial extruder, which can facilitate the structure and assembly with the minimum gear trains and equalize the drive power distribution at the gear meshing portions.

By providing the axial fine move means for the helical gear, moreover, the trouble of disassembling and re-assembling the drive transmission mechanism for the phase adjustment at the assembling time is not required. This axial fine move means is used most properly with the drive transmission mechanism for the biaxial extruder, which can be timed to transmit the drive force equally to the individual lines.

We claim:

1. A drive mechanism for a biaxial extruder having first and second output shafts connected to first and second screws, comprising:

first and second output gears respectively fitted on the first and second output shafts such that said first and second output gears are mutually offset on axes of the first and second output shafts, wherein a distance between said first screw and said first output gear is shorter than a distance between said second screw and said second output gear;

a first lower gear and a first upper gear respectively meshing with said first output gear, said first lower gear and said first upper gear being vertically spaced across the axis of the first output shaft;

a second lower gear and a second upper gear respectively meshing with said second output gear, said second lower gear and said second upper gear being vertically spaced across the axis of the second output shaft;

a common drive source; and a reduction gear train for quartering a drive force from the common drive source equally and distributing the quartered drive force to said first lower gear, said first upper gear, said second lower gear and said second upper gear, said reduction gear train comprising:

a) an upper intermediate shaft comprising torsion bars and having an upper input gear and first and second upper distribution gears mounted thereon, said first and second upper distribution gears respectively meshing with said first and second upper gears, b) a lower intermediate shaft comprising torsion bars and having a lower input gear and first and second lower distribution gears mounted thereon, said first and second lower distribution gears, respectively meshing with said first and second lower gears, and c) a center shaft having a drive gear meshing with said upper and lower input gears, wherein a spacing of said first upper distribution gear from said upper input gear on said upper intermediate shaft is greater than a spacing of said second upper distribution gear from said upper input gear on said upper intermediate shaft, and wherein a spacing of said first lower distribution gear from said lower input gear on said lower intermediate shaft is equal to a spacing of said first upper distribution gear from said upper input gear on said upper intermediate shaft and is greater than a spacing of said second lower distribution gear from said lower input gear on said lower intermediate shaft.

2. A drive mechanism for a biaxial extruder having first and second output shafts connected to first and second screws, comprising:

a gear fitted on at least one of said first and second output shafts;

a common drive source;

upper and lower distribution gear trains, each having at least one shaft having a gear mounted thereon, said upper and lower distribution gear trains being connected between said common drive source and said first and the second output shafts for distributing drive force from said common source to said first and second output shafts, said gear fitted on at least one of said first and second output shafts meshing with at least one of said upper and lower distribution gear trains; and axial fine move means for fitting said gear of said distribution gear trains on at least one said shaft of each of said distribution gear trains, said axial fine move means comprising a helical gear, said helical gear being one gear of each of said distribution gear trains such that a phase of said gear of each of said distribution gear trains may be adjusted by moving the helical gear along the axis of the at least one shaft of each of said distribution gear trains.

3. A drive mechanism for a biaxial extruder having first and second output shafts connected to first and second screws, comprising:

a common drive source;

upper and lower distribution gear trains, each having at least one shaft having a gear mounted thereon, said upper and lower distribution gear trains being connected between said common drive source and the first and the second output shafts for distributing drive force from said common source to said first and second output shafts; and axial fine move means for fitting said gear of said distribution gear trains on said at least one shaft of each of said distribution gear trains, said axial fine move means comprising a helical gear, said helical gear being one gear of each of said distribution gear trains such that a phase of said gear of each of said distribution gear trains may be adjusted by moving the helical gear along the axis of the at least one shaft of each of said distribution gear trains.

* * * * *